WAVE NUMBER (cm⁻¹)

WAVE NUMBER (cm⁻¹)

Fig. 5-a
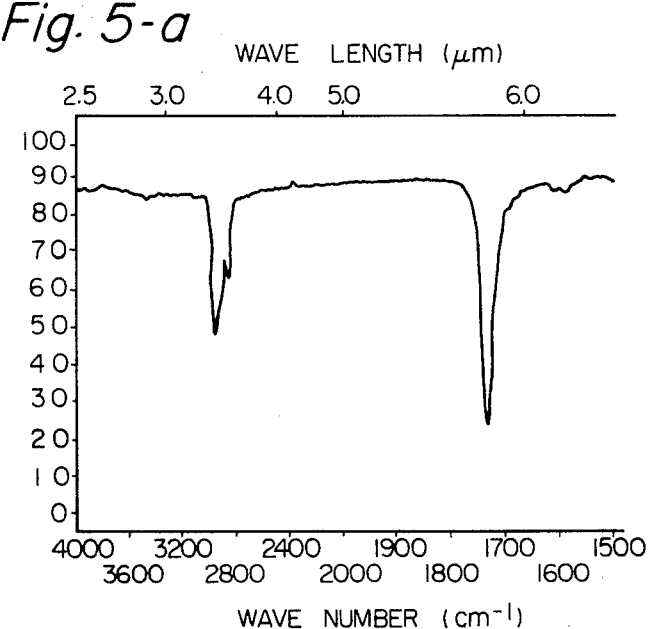
Fig. 5-b
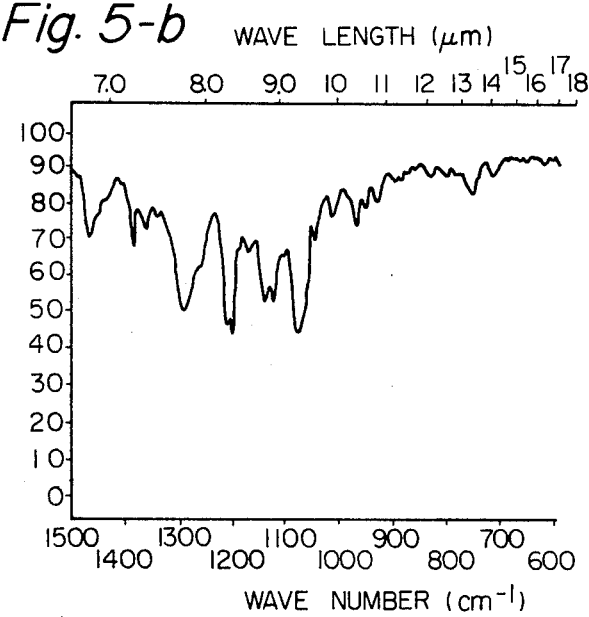

Fig. 6-a
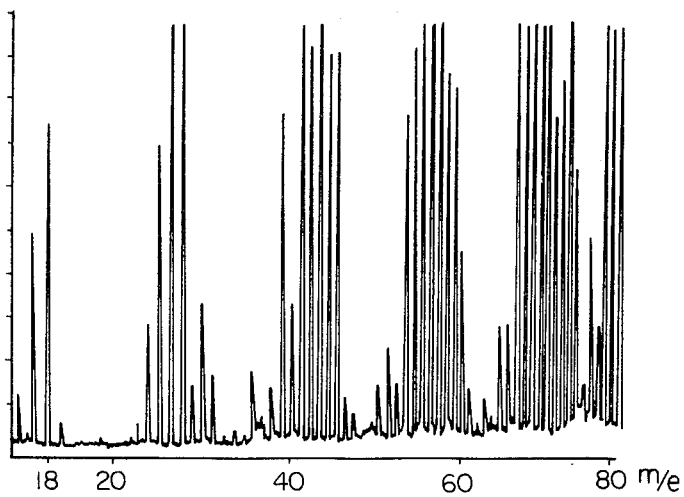
Fig. 6-b
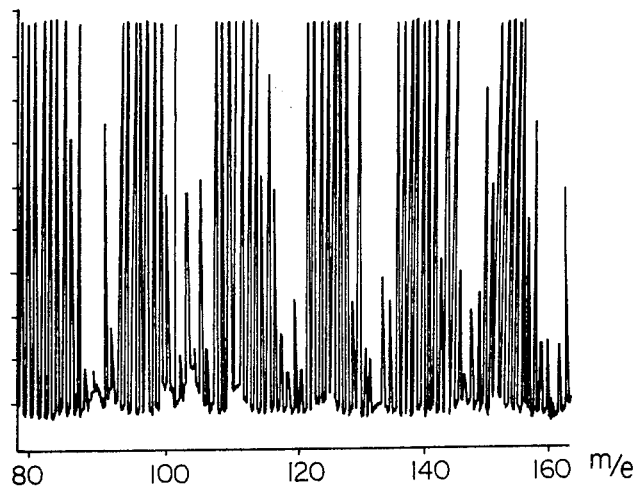

Fig. 6-c
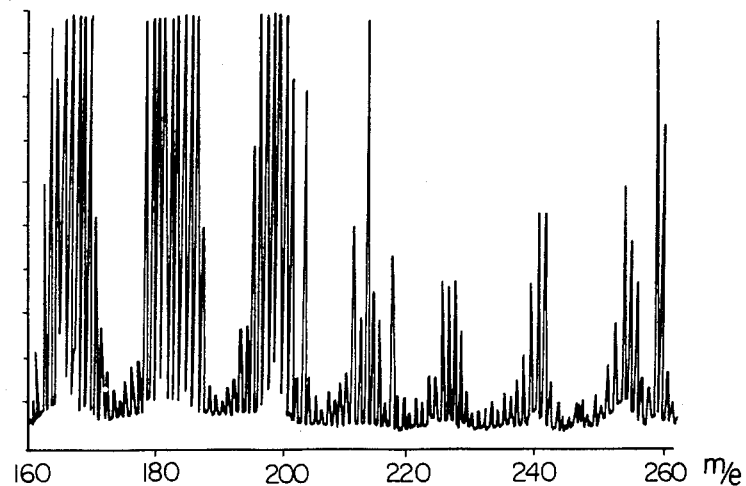
Fig. 6-d
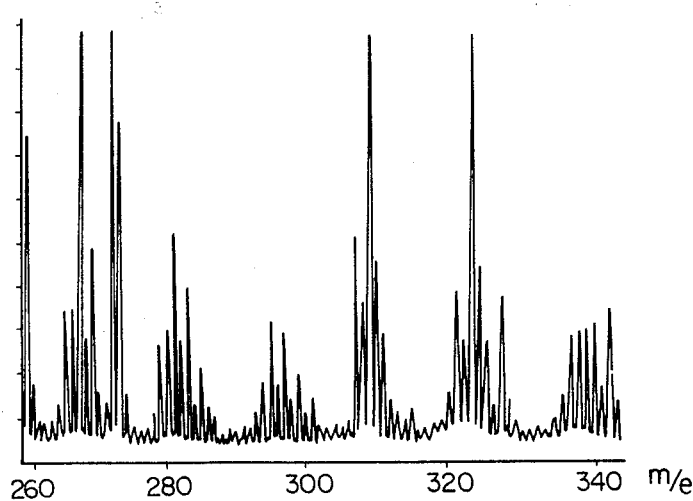

Fig. 6-e
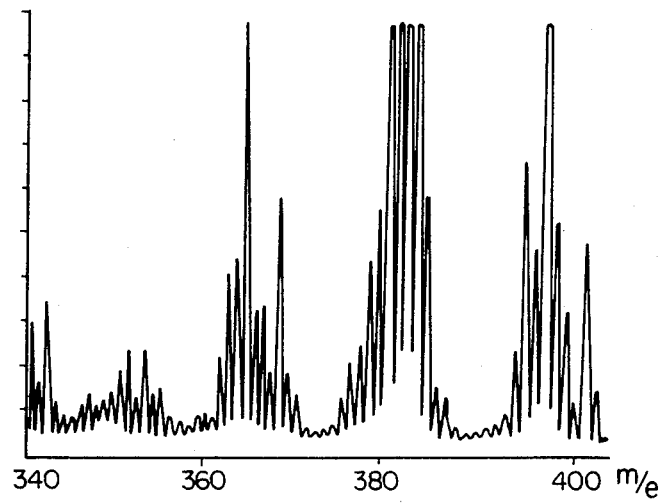
Fig. 6-f
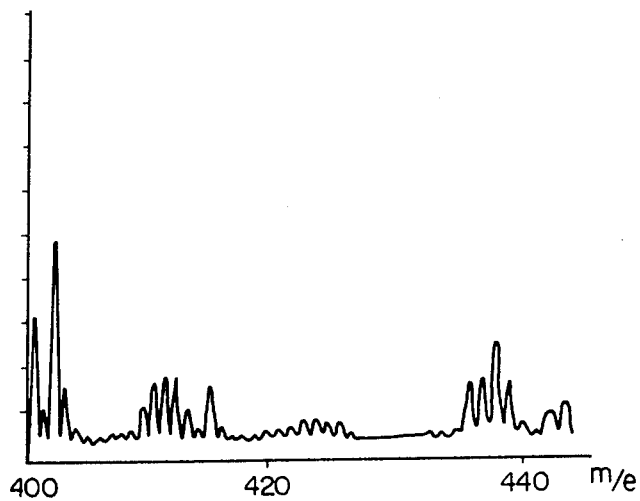

Fig. 6-g
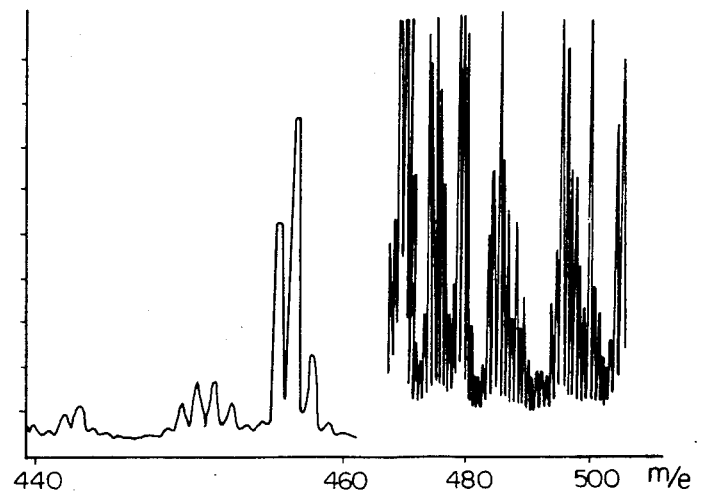
Fig. 6-h
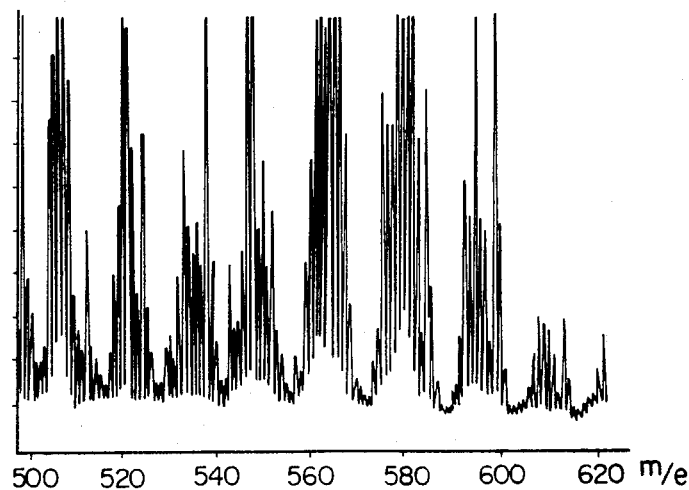

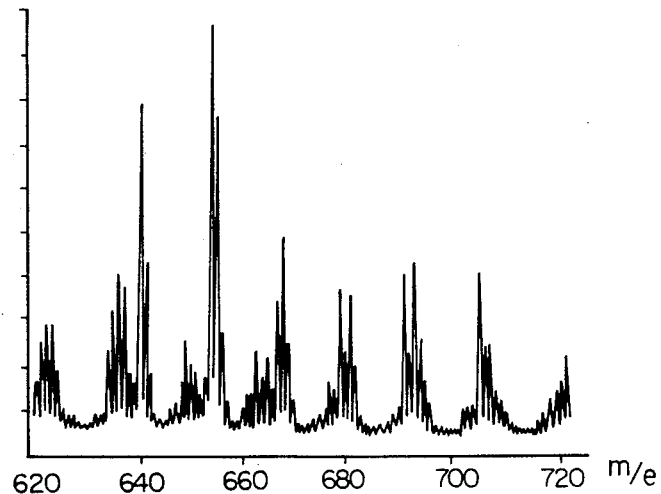
Fig. 6-i
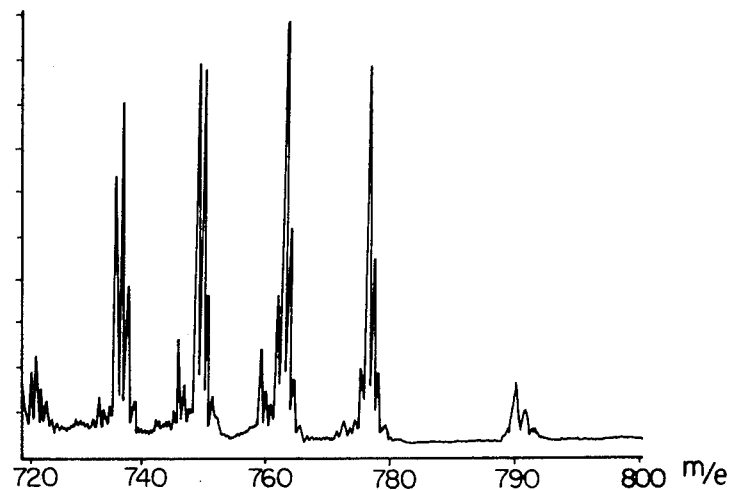
Fig. 6-j

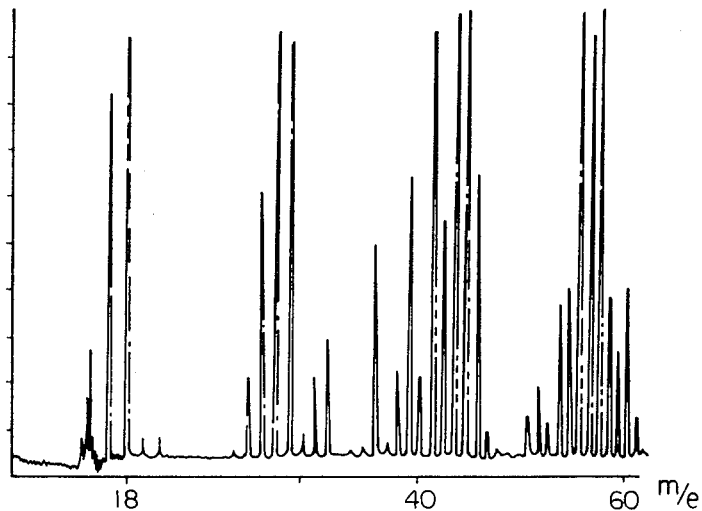
Fig. 7-a
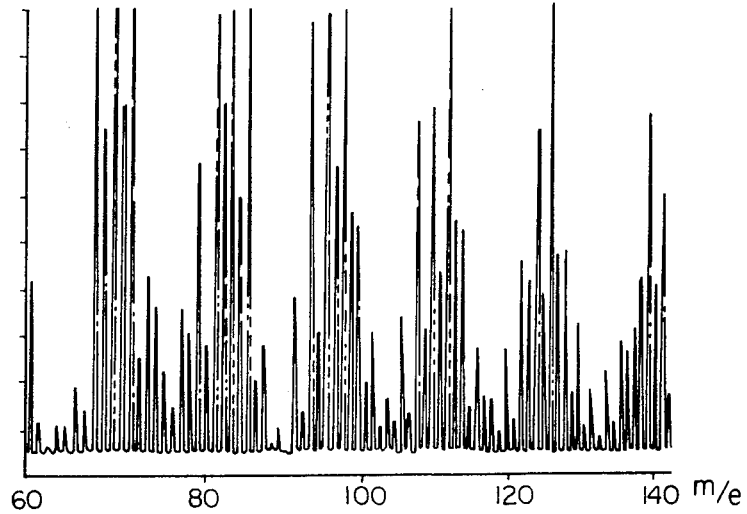
Fig. 7-b

Fig. 7-c
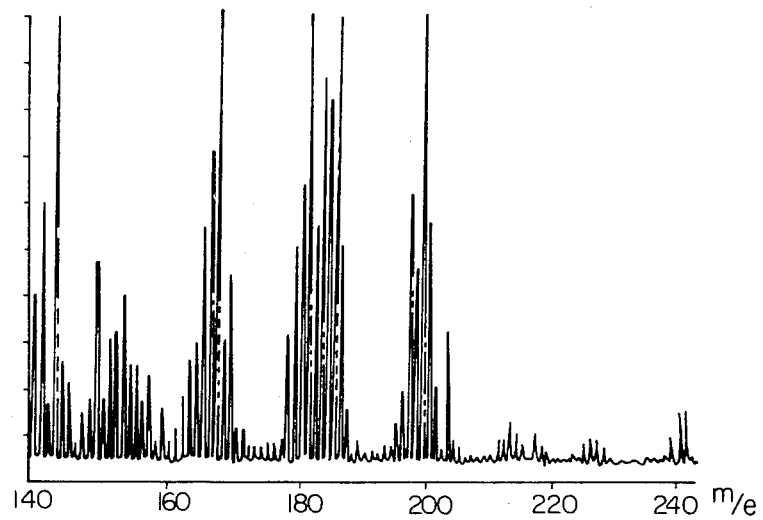
Fig. 7-d
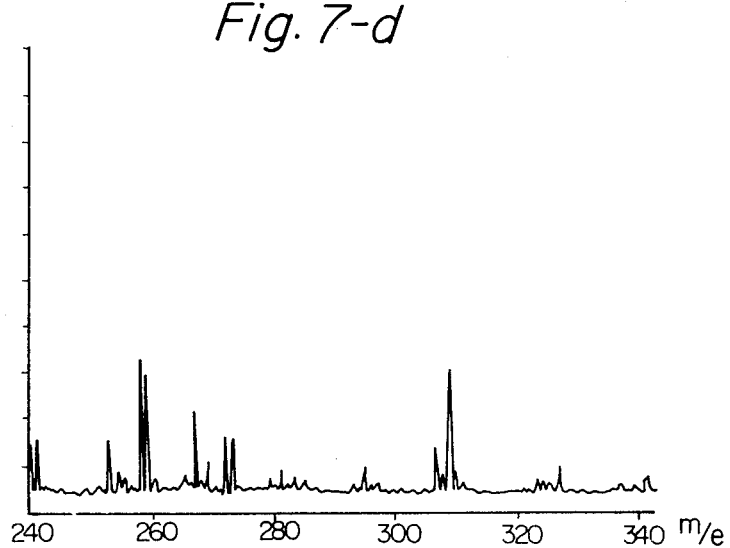

Fig. 7-e
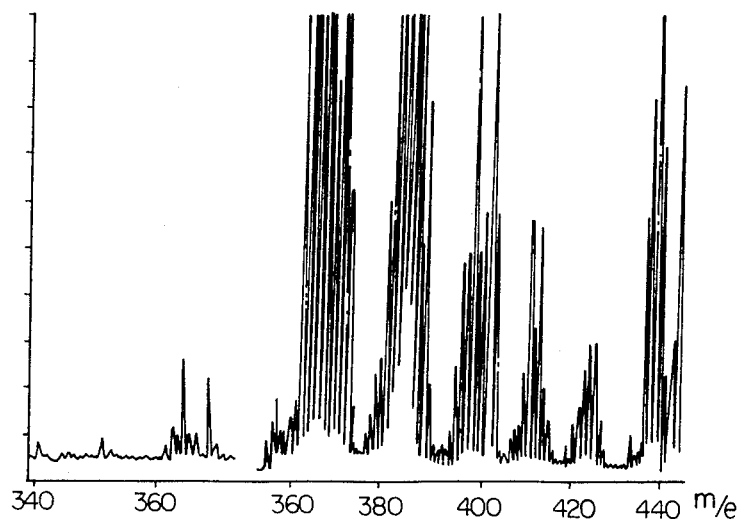
Fig. 7-f
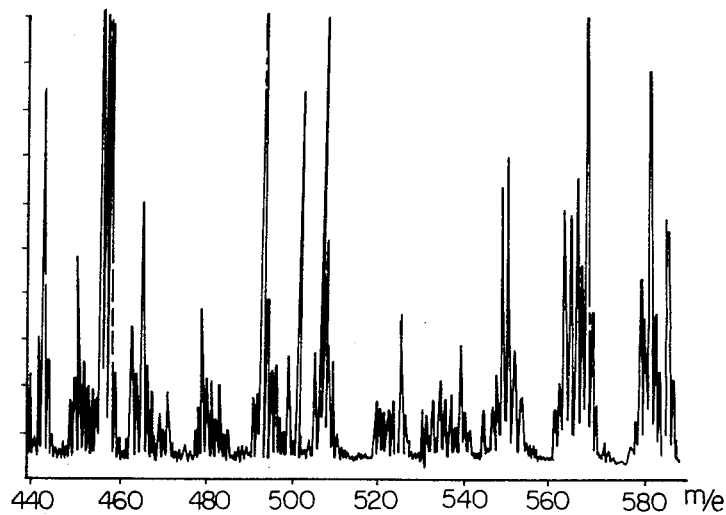

Fig. 7-g
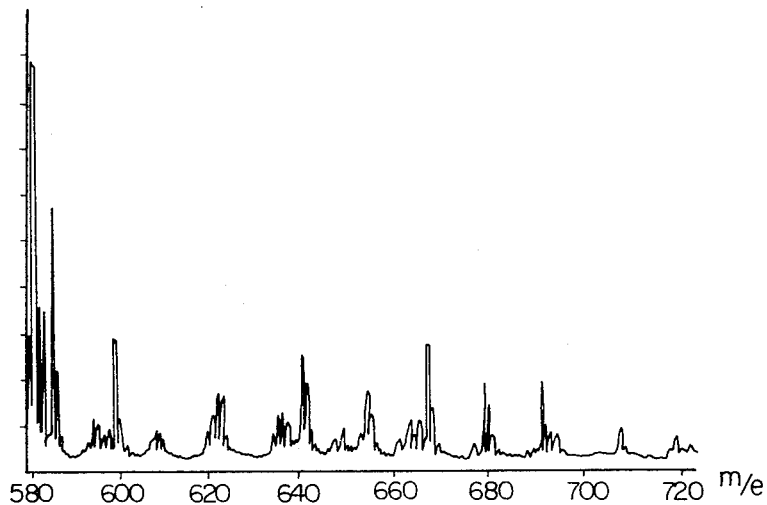
Fig. 7-h
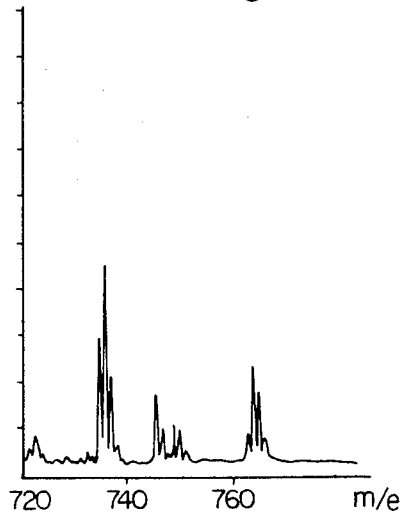

Fig. 8-a
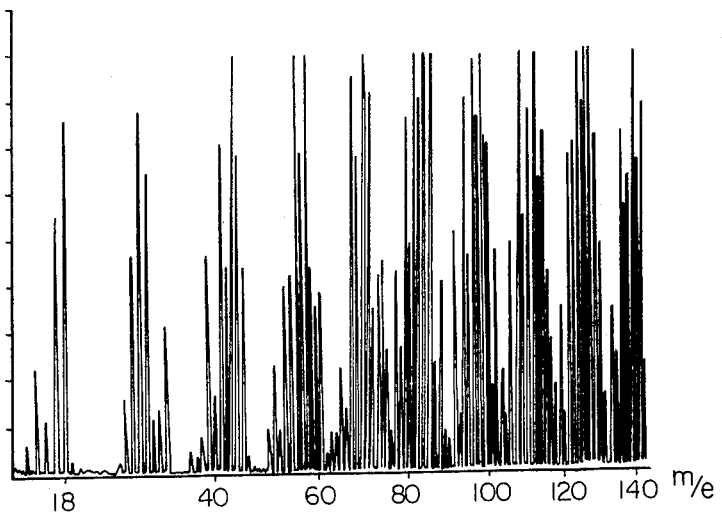
Fig. 8-b
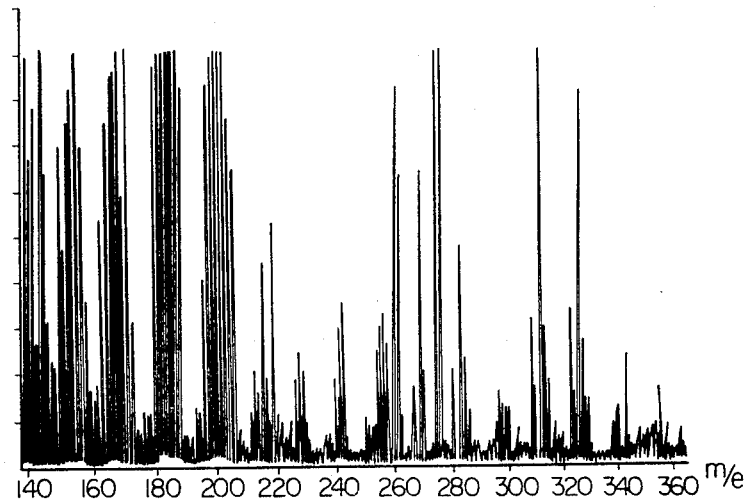

Fig. 8-c
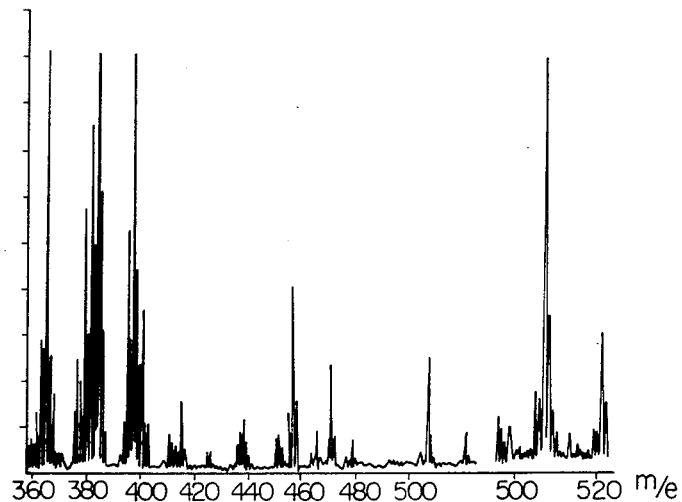
Fig. 8-d
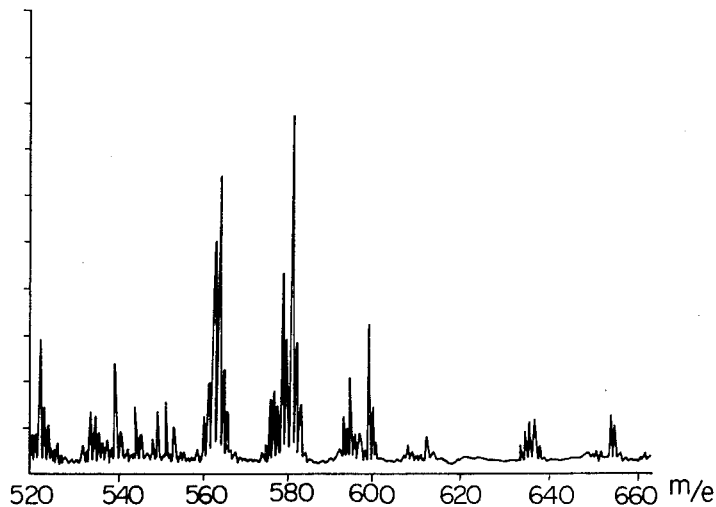

Fig. 8-e
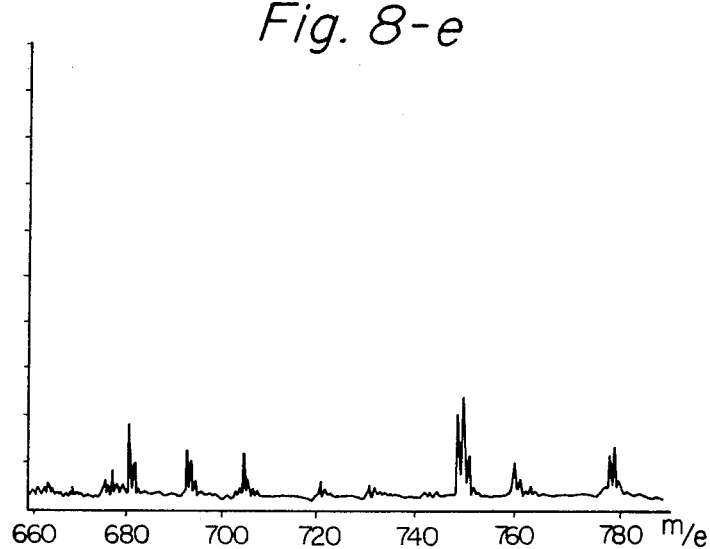
Fig. 9-a
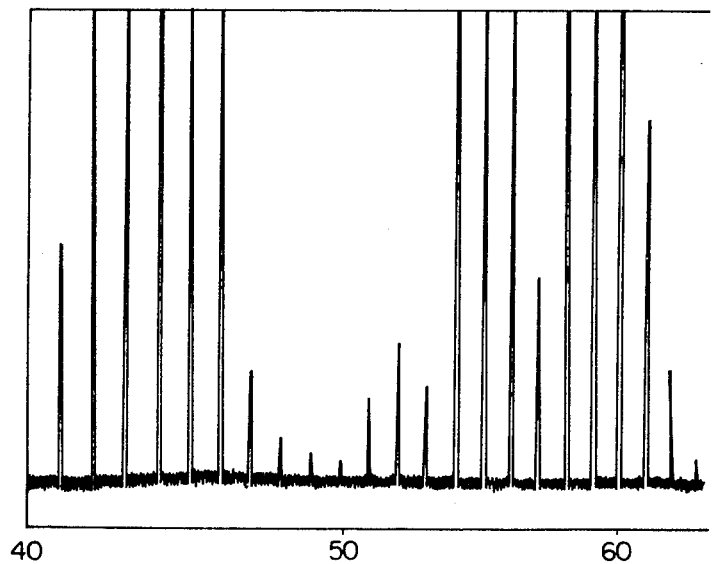

Fig. 9-b
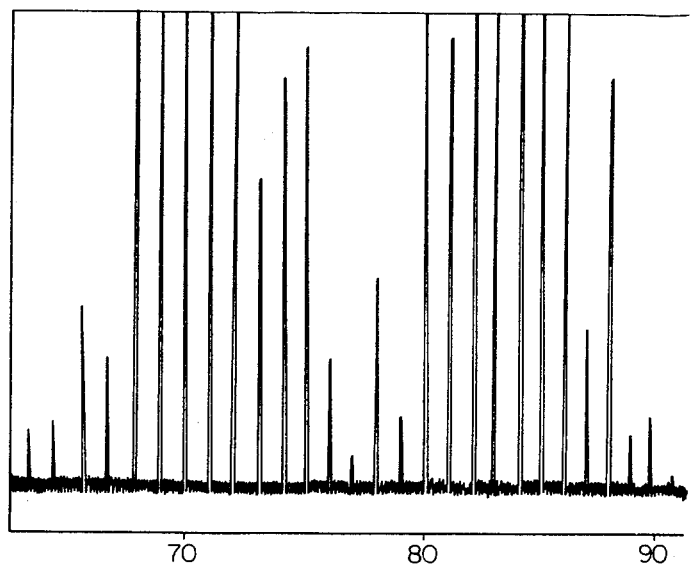
Fig. 9-c
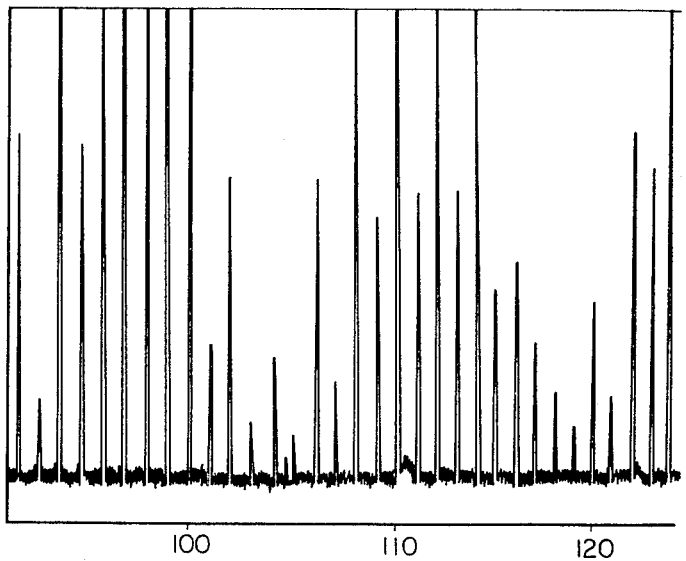

Fig. 9-d
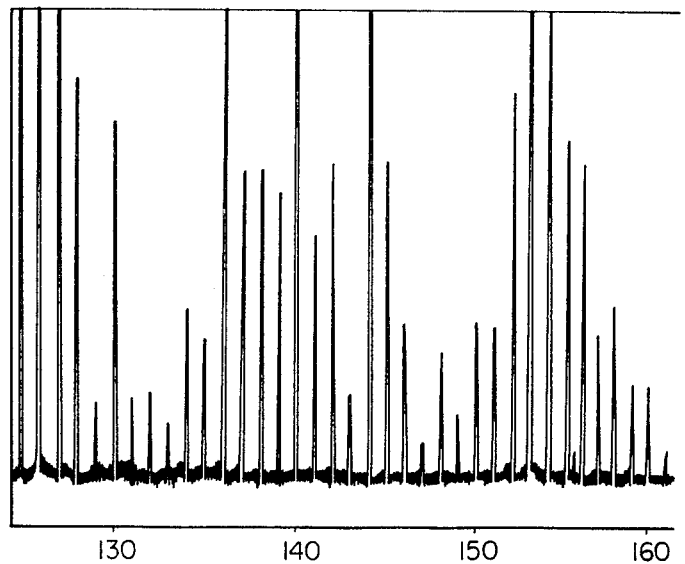
Fig. 9-e
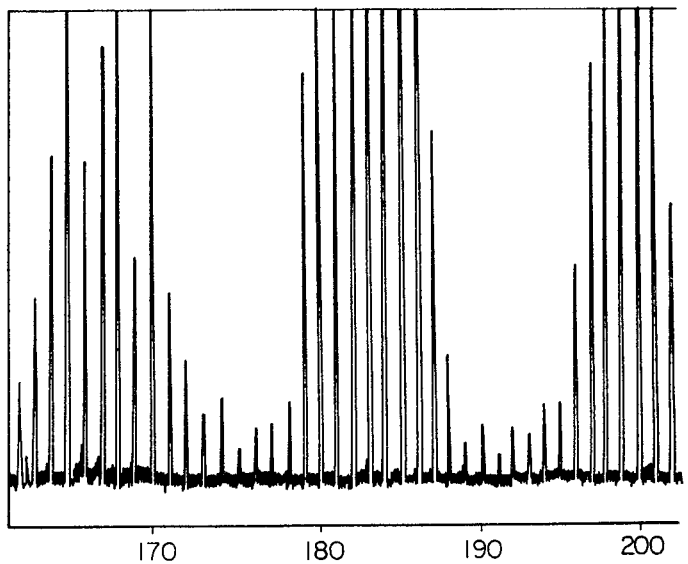

Fig. 9-f
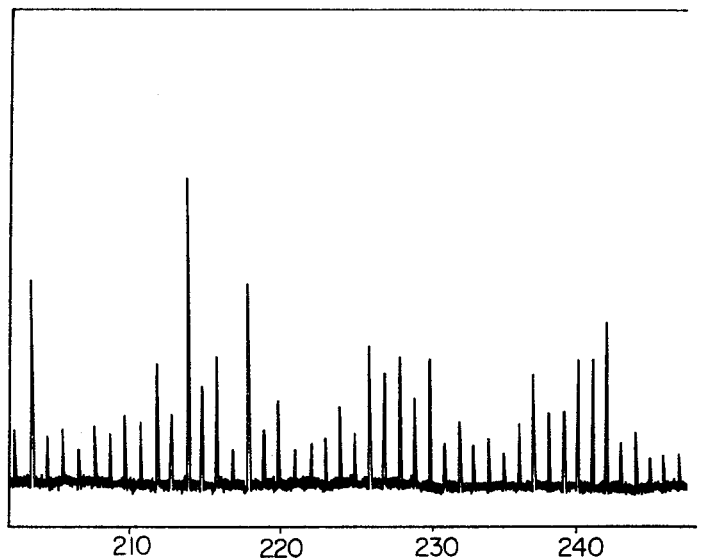
Fig. 9-g
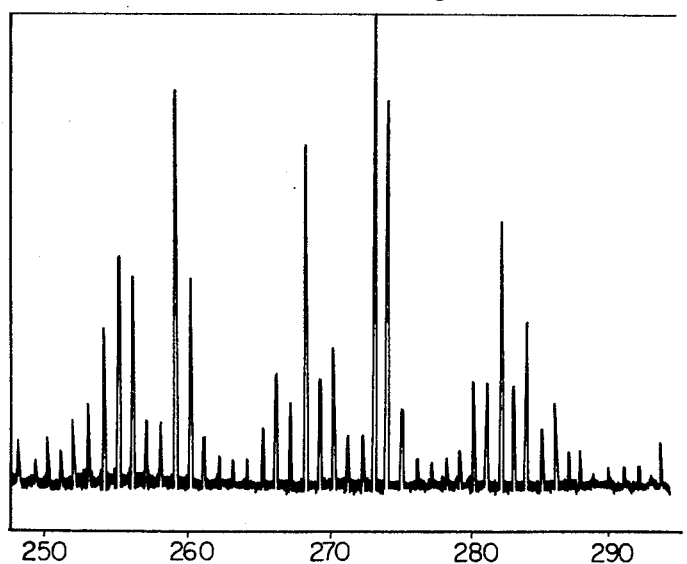

Fig. 9-h
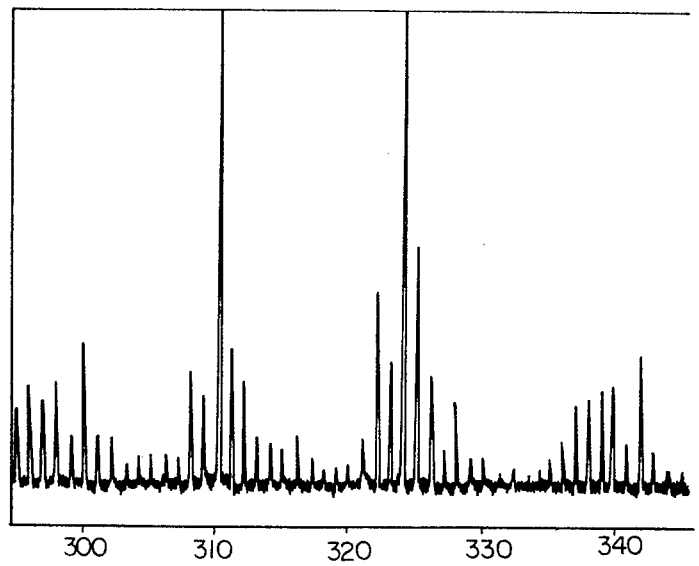
Fig. 9-i
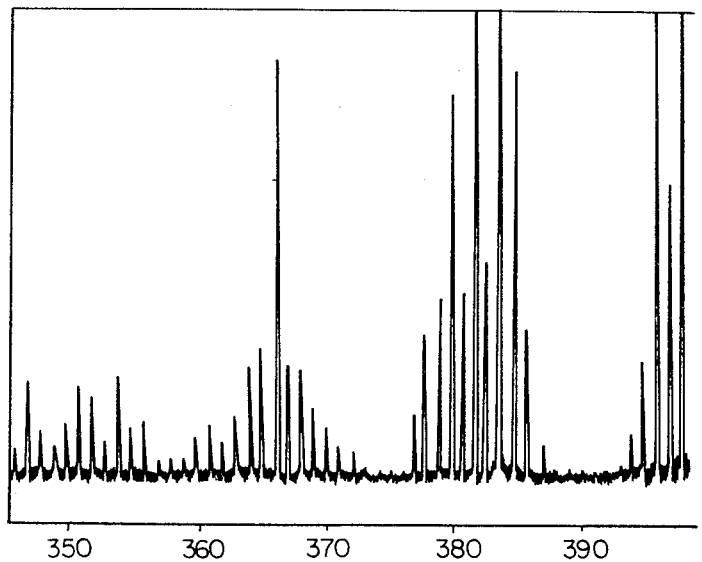

Fig. 9-j
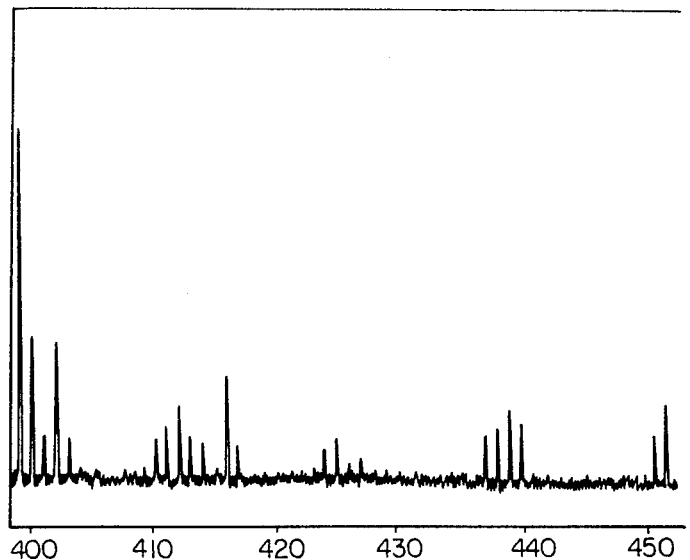
Fig. 9-k
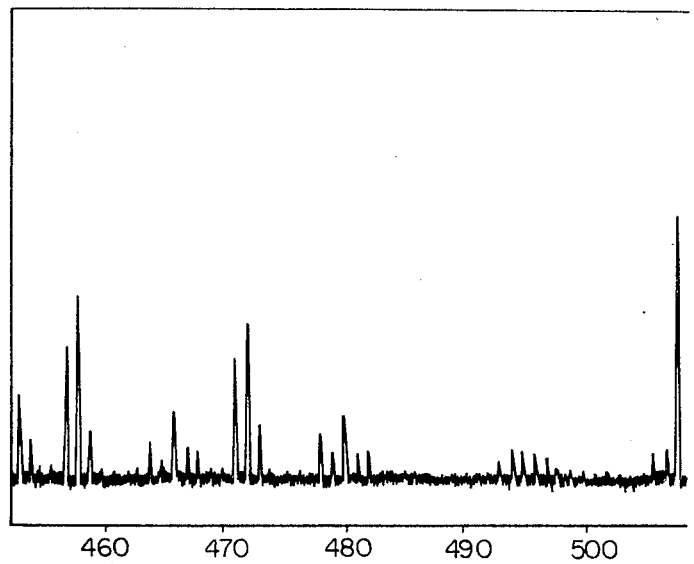

Fig. 9-l
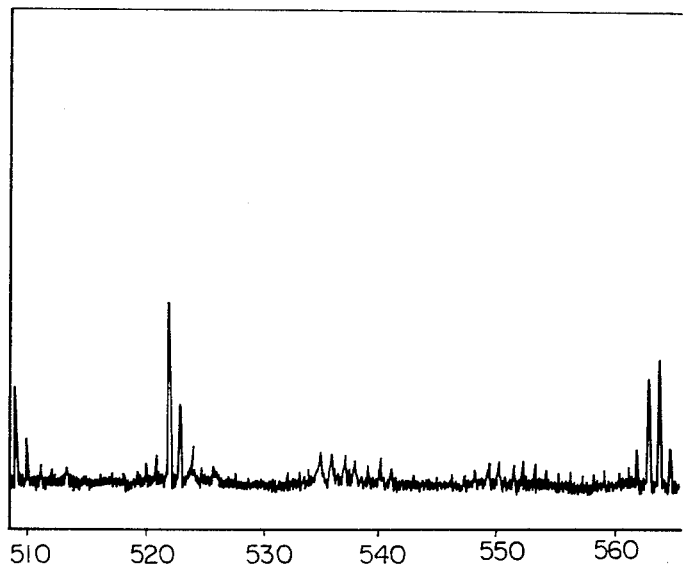
Fig. 9-m
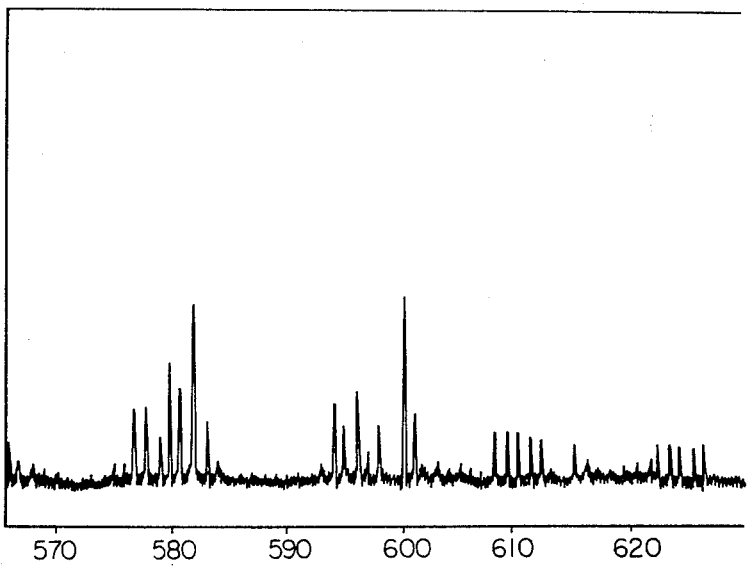

Fig. 9-n
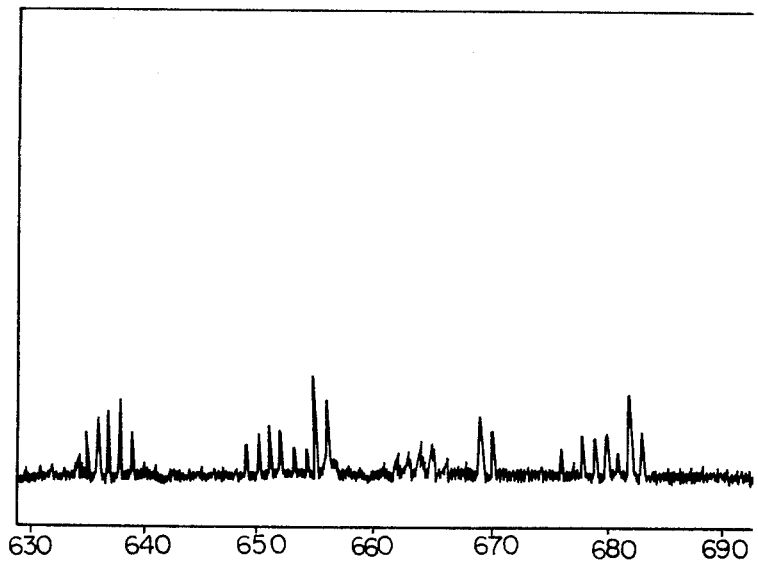
Fig. 9-o
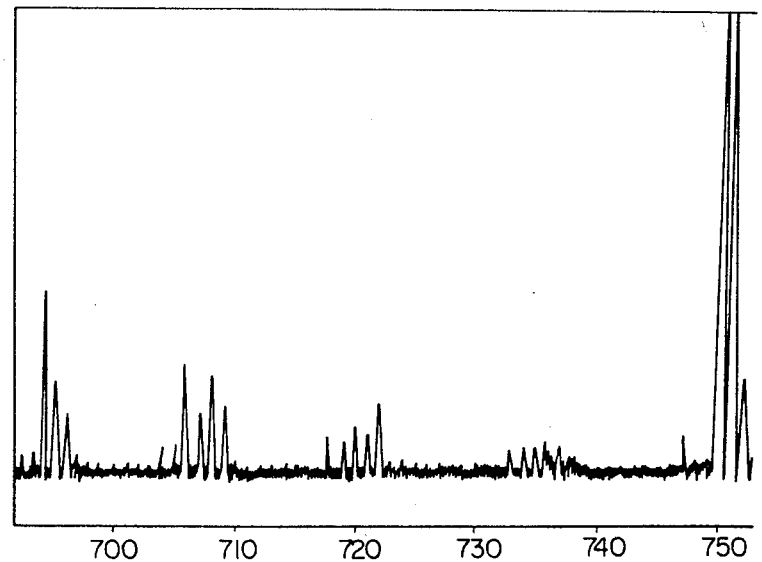

Fig. 9-p
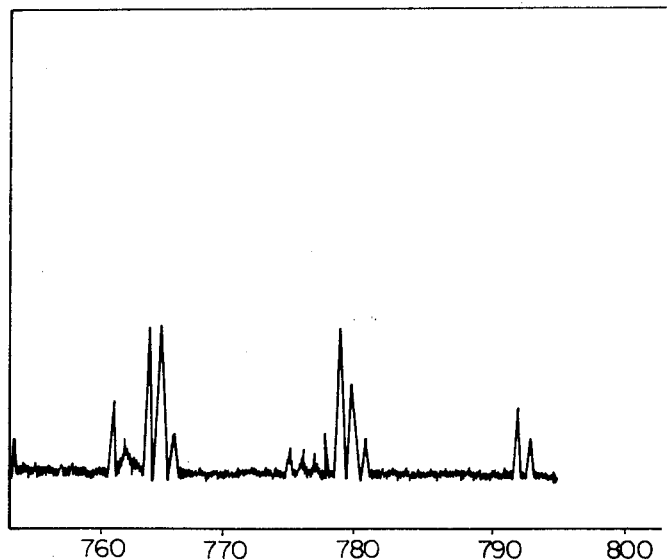
Fig. 10
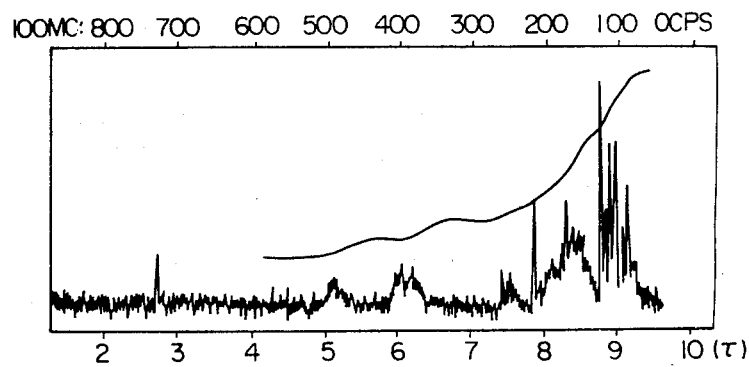

United States Patent Office 3,743,724
Patented July 3, 1973

3,743,724
ANTIBIOTIC COMPLEX S-3466 AND PROCESS FOR MAKING SAME
Kunio Ando, Kawasaki-shi, and Hideo Oishi, Takao Sagawa, and Seiji Hirano, Tokyo, Japan, assignors to Chugai Seiyaku Kabushiki Kaisha, Tokyo, Japan
Filed Feb. 18, 1971, Ser. No. 116,342
Claims priority, application Japan, Feb. 24, 1970, 45/15,358
Int. Cl. A61k 21/00
U.S. Cl. 424—122
7 Claims

ABSTRACT OF THE DISCLOSURE

An antibiotic complex designated as S-3466 and the three crystalline components isolated therefrom designated as S-3466 A, S-3466 B and S-3466 C, which are biologically active and useful as antimicrobial, insecticidal and miticidal agents, are produced by cultivating a microorganism, Streptomyces aureus, in a chemically defined or natural nutrient medium containing assimilable carbon sources, nitrogen sources and inorganic salts under aerobic conditions to produce antibiotic complex S-3466 in mycelium. The complex S-3466 can be separated by column chromatography into S-3466 A, S-3466 B and S-3466 C.

This invention relates to the cultivation of a microorganism of Streptomyces aureus, to the biologically active complex produced thereby, to methods for the recovery and concentration of the complex from crude solutions of this new and useful complex designated as antibiotic complex S-3466 and to the methods for the separation of said complex into three biologically active, crystalline components designated as S-3466 A, S-3466 B, and S-3466 C.

More specifically, this invention relates to the antibiotic complex S-3466 and to the three biologically active crystalline substances isolated therefrom, in both crude and purified forms, and to methods for the preparation, isolation and separation of these substances from each other.

The antibiotic complex and the three active components isolated therefrom possess useful antimicrobial, insecticidal and miticidal activities which make them useful for application in agriculture against a variety of microorganisms, insects, and mites.

The microorganism employed in this invention was isolated from a soil sample of Tsurugashima-cho, Iruma-gun, Saitama, Japan. It was identified by the inventors, by criteria given in "Bergey's Manual of Determinative Bacteriology" 7th edition, "The Actinomycetes" by S. A. Waksman and other literature on the classification of actinomycetes, as a strain of Streptomyces aureus. A culture of this strain has been deposited with the Fermentation Research Institute, Japan, under the number FERM-P No. 233 and with the American Type Culture Collection under the number ATCC 21428, together with an example of mutant artificially derived therefrom. Streptomyces aureus referred to in this specification has been deposited with the Fermentation Research Institute, Japan, under FERM-P No. 233 and the American Type Culture Collection, Rockville, Md., under ATCC 21428. All restrictions on the availability to the public of this strain will be irrevocably removed upon the granting of the patent and the deposit will be maintained to assure the permanent availability thereof to the public throughout the effective life of the patent resulting from this application. Cultural characteristics of the microorganisms are as follows:

(I) Morphological characteristics
  (1) Long and straight or wave-shaped sporophores which do not form a spiral
  (2) Spherical or oval spores, the dimension of which range from 0.7–0.8 x 0.9–1.0μ.
(II) Cultural characteristics in various media (observed after two weeks' cultivation at 25° C. The color determination was made according to the "Iro no Hyōjun" published by Nihon Shikisai Kenkyu-jo, Japan)
  (1) Sucrose-nitrate agar medium
    Growth: Slight growth
    Aerial mycelium: Slight and powdery growth, cream colored
    Soluble pigment: No production
  (2) Glycerin-calcium malate agar medium
    Growth: Cream-colored and good growth
    Aerial mycelium: Powdery and yellow-white
    Soluble pigment: Light brown
  (3) Glucose-asparagine agar medium
    Growth: Pale yellow and good growth
    Aerial mycelium: Powdery and yellow-white
    Soluble pigment: Light yellow
  (4) Glycerin-asparagine agar medium
    Growth Good growth
    Aerial mycelium: Powdery growth, light yellow
    Soluble pigment: Light yellow-brown
  (5) Ordinal nutrient agar medium
    Growth: Good growth
    Aerial mycelium: Pale yellow
    Soluble pigment: Light yellow-brown
  (6) Bennet medium
    Growth: Good growth, wrinkled and raised at center
    Aerial mycelium: Yellowish gray
    Soluble pigment: Dark yellow-brown
  (7) Starch agar medium
    Growth: Moderate growth, colorless
    Aerial mycelium: Yellow-white
    Soluble pigment: Light yellow-orange
  (8) Potato medium
    Growth: Good growth, yellow-brown, wrinkled
    Aerial mycelium: Light brown-gray
    Soluble pigment: Black
  (9) Nitrate medium
    Growth: Soft hair-like growth
    Other: Nitrate reduction; positive
  (10) Gelatin agar medium
    Growth: Growing in the surface
    Aerial mycelium: White
    Soluble pigment: Brown
    Other: Slow liquefaction and becomes crater-like
  (11) Litmus milk medium
    Growth: Good growth, ring formed
    Other: Weak coagulation and peptonization
  (12) No invertase activity
  (13) Starch-peptone agar medium
    Growth: Good growth, wrinkled
    Aerial mycelium: Light yellow-brown
    Soluble pigment: Dark yellow-brown
  (14) Cellulose-asparagine medium
    No growth
    No hydrolysis
  (15) Dextrin casein medium
    Growth: Wrinkled, yellow-brown
    Aerial mycelium: Brown-white
    Soluble pigment: Dark yellow-brown It is well known that microorganisms belonging to genus Streptomyces generally tend to change naturally or artificially in morphological characteristics and observation in various media. Accordingly, a microorganism which shows different micrological characteristics from those given above can also be used in the present invention as an antibiotic complex S-3466-producing microorganism as long as its variant has not lost the ability to produce the novel antibiotic complex S-3466.

The desired antibiotic complex S-3466 of this invention is accumulated in the mycelium by aerobically culturing Streptomyces aureus in a chemically defined or natural culture medium. The medium may be one commonly employed in the cultivation of Streptomyces aureus and containing assimilable carbon sources, assimilable nitrogen sources and inorganic salts. If necessary, a small amount of nutrient, growth-promoting substances, precursers and the like may also be added to the culture medium.

The carbon sources commonly employed for such cultivation include, for example, glucose, maltose, fructose, molasses, starch, dextrin, glycerin, etc., and the nitrogen sources include the organic nitrogenous compounds such as soybean meal, meat extract, peptone, corn steep liquor, yeast and the like, and the inorganic compounds such as nitrates, ammonium salts and the like. The inorganic salts include sodium chloride, potassium dihydrogenphosphate, dipotassium hydrogenphosphate, calcium carbonate and the like.

The medium having an approximately neutral pH prepared from the above ingredients is inoculated with an inoculum of Streptomyces aureus followed by the aerobic cultivation at a temperature of from 25° C. to 30° C. After two to six days of the cultivation, the accumulation of the antibiotic complex S-3466 in the fermented broth reaches the maximum.

The antibiotic complex S-3466 may be separated and recovered by the conventional method. The fermented broth is filtered and the filter cake is extracted with a water-miscible organic solvent e.g. methanol, acetone. The water-miscible organic solvent extract is concentrated in vacuo to remove the solvent and re-extracted with a water-immiscible organic solvent, e.g. ethyl acetate, n-hexane. The antibiotic complex is obtained by concentration of the water-immiscible organic solvent extract in vacuo as a tarry and oily substance (crude).

When the mycelium is collected by filtration, however, it is preferable, prior to the filtration, to heat the broth at a temperature of about 80° C. for a period of approximately one to three hours, more preferably at the pH of about 3.0, since the mycellium of Streptomyces aureus is so fine and pulpy that makes the filtration difficult and that results in a considerable loss of mycelium. The pH may be adjusted by a mineral acid or an organic acid such as hydrochloric acid, sulfuric acid and acetic acid.

The extraction of the antibiotic complex with the water-miscible solvent may be carried out at a normal temperature, but it is advantageous to carry out the extraction while refluxing to improve the yield of the desired complex, and more, advantageously, while refluxing using methanol because the purity is also improved as well as the increase of the yield. When the fermentation broth, the pH of which has been adjusted to 3 with sulfuric acid, is heated at a temperature of 80° C. for about one hour and then filtered and the filter cake thus obtained is refluxed for three hours with methanol, the extraction efficiency is 5 to 150 times higher in addition to shortage of the extraction time than where the filter cake is extracted at a normal temperature without the pH adjustment, heat-treatment and refluxing.

Some tests are shown to explain this effect below:

The antibiotic complex S-3466 is generally obtained as red brown to pale yellow tarry oil at first, and it can be crystallized as colorless or slightly yellowish prismatic crystals by allowing it to stand in a freezer for relatively long period of time, e.g., for approximately one week, or by subjecting it to column chromatography using silica gel.

The antibiotic complex S-3466 is neutral substance and stable against heat and light. M.P. 72–75° C. (recrystallized from n-hexane). The complex is easily soluble in most of the organic solvents such as n-hexane, benzene, chloroform, diethyl ether, acetone, ethyl acetate, petroleum ether and alcohols but insoluble in water. Elementary analysis: C, 66.07%, H, 9.07%, halogens, nitrogen and sulfur are not detected. The following reactions are all negative; Fehling, Tollens, Carbazole, Elson-Morgan and Ninhydrin.

The complex show no ultraviolet absorption maxima in the region of 200–400 m$\mu$ in methanol (FIG. 1). When infrared absorption spectrum is measured on a liquid film, characteristic bands appear at 2960, 2920, 2860, 1733, 1460, 1381, 1334, 1274, 1195, 1171, 1122, 1092, 1063 and 950 cm.$^{-1}$. This indicates the presence of methyl radical, methylene radical, carbonyl, carboxylic acid ester. The IR spectrum is shown in the FIG. 2.

Mass spectrum shows parent peak at m/e 792 (FIG. 6). NMR spectrum measured in $CDCl_3$ shows absorptions of 9.12$\tau$ (triplet), 8.81$\tau$ (doublet) and 8.73$\tau$ (doublet) (FIG. 10).

Thin layer chromatography of the thus obtained crude crystals of the antibiotic complex S-3466 on silica gel using a solvent such as n-hexane, chloroform, ethyl acetate, etc. or a mixture thereof in an appropriate proportion showed three spots with approximately the same size adjacent to each other. This indicates that the antibiotic complex S-3466 contains at least three closely related components. These components are designated as S-3466 A, S-3466 B and S-3466 C from the top, respectively.

The components of S-3466 A, S-3466 B and S-3466 C can be separated from each other by column chromatography using silica gel and n-hexane, chloroform, ethyl acetate, etc. as an eluent. For example, when chloroform solution of antibiotic complex S-3466 is poured at the top of the silica gel column, S-3466 A is eluted at first from the column with the mixed solvent of chloroform: ethyl acetate (2:1), S-3466 B is next eluted with the solvent mixture of chloroform:ethyl aceate (1:1), and finally the column is washed with ethyl acetate and S-3466 C is recovered from the eluate by evaporation of the solvent in vacuo. Each component may be crystallized as prisms by the same crystallization procedures as S-3466 complex.

FIG. 5 illustrates an infrared absorption spectrum of the antibiotic S-3466 C.

FIG. 6 illustrates an absorption spectrum of mass spectrophotometry of the antibiotic complex S-3466, in

| Experiment | Treatment of the broth | Time for filtration, minutes | Solvent, ml. | Extraction condition | Yield,[1] $\gamma$/ml. |
|---|---|---|---|---|---|
| 1 | Untreated | 110 | Acetone, 100 | Room temperature overnight | 63 |
| 2 | pH 3; heated at 80° C. for 1 hour | 2.5 | do | Reflux for 3 hours | 1,600 |
| 3 | do | 3 | Methanol, 100 | do | 10,000 |

[1] Yield was determined by pulp-disc method.

which it is measured by increased sensitivity of the spectrometer above approximately m/e 457, using Hitachi RMU–6E mass spectrometer.

FIG. 7 illustrates an absorption spectrum of mass spectrometry of the antibiotic S–3466 A, in which it is measured by increased sensitivity of the spectrometer above approximately m/e 360, using Hitachi RMU–6E mass spectrometer.

FIG. 8 illustrates an absorption spectrum of mass spetrometry of the antibiotic S–3466 B, in which it is measured by increased sensitivity of the spectrometer above approximately m/e 500, using Hitachi RMU–6E mass spectrometer.

FIG. 9 illustrates an absorption spectrum of mass spectrometry of the antibiotic S–3466 C, using Hitachi RMU–6E mass spectrometer.

FIG. 10 illustrates an NMR spectrum of the antibiotic complex S–3466, using Japan Electron Optics JNM–3H–100 nuclear magnetic resonance spectrometer (in $CDC_3$; TMS as internal standard).

Figure 11:
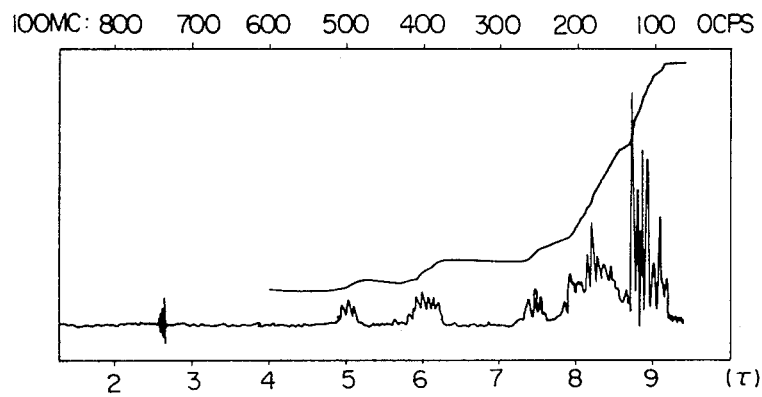

FIG. 11 illustrates an NMR spectrum of the antibiotic S–3466 A, using Japan Electron Optics JNM–3H–100 nuclear magnetic resonance spectrometer (in $CDCl_3$; TMS as internal standard).

Figure 12:
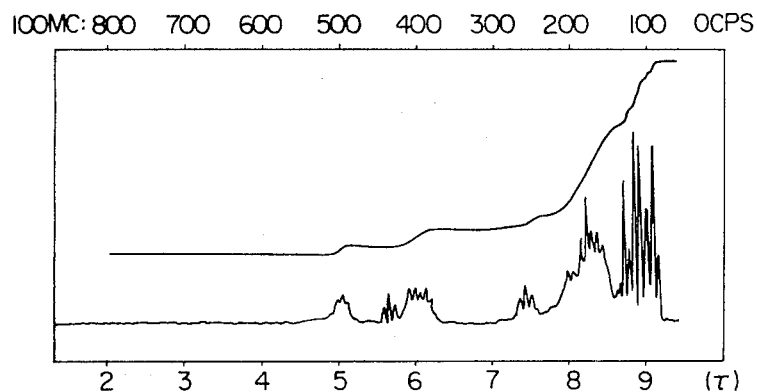

FIG. 12 illustrates an NMR spectrum of the antibiotic S–3466 B, using Japan Electron Optics JNM–3H–100 nuclear magnetic resonance spectrometer (in $CDCl_3$; TMS as internal standard).

Figure 13:
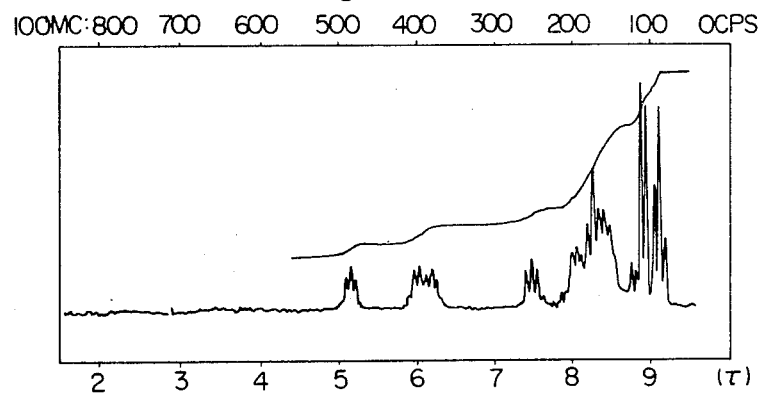

FIG. 13 illustrates an NMR spectrum of the antibiotic S–3466 C, using Japan Electron Optics JNM–3H–100 nuclear magnetic resonance spectrometer (in $CDCl_3$; TMS as internal standard).

The properties of the antibiotic S–3466 A, S–3466 B and S–3466 C are shown in Table 1.

The antibiotic complex S–3466 and the antibiotics S–3466 A, S–3466 B and S–3466 C having the above properties possess useful antimicrobial, insecticidal and miticidal activities and are, in particular, superior in killing the adult worm and ovum of mites.

However, the above antibiotics exhibit remarkably low toxicity to animals including human beings and plants, and do not show any sign of toxicity to such plants as daisy, tomato, egg-plant, kidney beans, cucumber even at a level of 1600 p.p.m. In tests for acute toxicity in mice, the antibiotics have been found to have a 50% lethal dose of 3450 mg./kg. by oral administration. Also, they are not irritative to the skin of a human being.

The following examples are given by way of illustration and are not to be construed as a limitation of this invention, many variations of which are possible without departing from the spirit or scope thereof.

EXPERIMENT 1

Antimicrobial activity of the antibiotic complex S–3466

The minimum inhibitory concentration (MIC) of the titled antibiotic against the various microorganism was determined by the agar medium dilution method. The results obtained were as shown below:

| Positive case: | MIC (mcg./ml.) |
|---|---|
| Bacillus megaterium IAM 1030 | 0.2 |
| Bacillus subtilis IAM 1033 | 0.2 |
| Micrococcus luteus IAM 1490 | 0.8 |
| Corynobacterium michiganense | 0.2 |
| Mycobacterium tuberculosis $H_{37}RV$ | 0.63 |
| Staphylococcus aureus IAM 1296 | 0.8 |

Negative Case (at a level higher than $50\gamma$ of the antibiotic):
  Escherichia coli IAM 1016.
  Proteus vulgaris.
  Aspergillus fumigates.

TABLE

| | Antibiotic S–3466 A | Antibiotic S–3466 B | Antibiotic S–3466 C |
|---|---|---|---|
| Appearance and properties. | Colorless prism, neutral and stable against heat and light. | Same as S–3466 A. | Same as S–3466 A. |
| Melting point | 73° to 74° C. (recrystallized from n-hexane) | 79° to 80° C. (n-hexane) | 105° to 106° C. (n-hexane); |
| Solubility | Soluble in most of the organic solvents such as n-hexane benzene chloroform, diethyl ether, acetone, ethyl acetate, petroleum, ether and alcohols. | Same as S–3466 A. | Same as S–3466 A. |
| Elemental analysis | Composed of carbon, hydrogen and oxygen as constitutive elements and containing no nitrogen, sulfur and halogen. C, 65.58%; H, 8.85%. | Same as S–3466 A. C, 66.48%; H, 8.97%. | Same as S–3466 A. C, 65.41%; H, 9.13%; |
| Infrared absorption spectrum. | Fig. 3. The spectrum is measured on a liquid film and shows absorptions at 2,960, 2,920, 2,860, 1,733, 1,460, 1,381, 1,334, 1,274, 1,195, 1,171, 1,122, 1,092, 1,063 and 950 cm.$^{-1}$. Strong absorption at 1,735 cm.$^{-1}$ as emasured by KBr disc method. Strong absorption at 1,720 cm.$^{-1}$ as measured by the $CHCl_3$ solution method. This indicates the presence of methyl radical, methylene radical, carbonyl, carboxylic acid ester. | Fig. 4. Nearly the same as that of S–3466 A. Strong absorption at 1,735 cm.$^{-1}$ as measured by KBr disc method. This indicates the presence of methyl radical, methylene radical, carbonyl, carboxylic acid ester. | Fig. 5. Nearly the same as that of S–3466 A; Strong absorption at 1,735 cm.$^{-1}$ as measured by KBr dis method. This indicates the presence of methyl radical, methylene radical, carbonyl, carboxylic acid ester. |
| Absorption spectrum by mass spectrometry. | Fig. 7. Parent peak at m/e 764 indicating that the molecular weight is 764. (The spectrum being measured by increased sensitivity of the spectrometer above approximately m/e 360.) | Fig. 8. Parent peak at m/e 778 indicating that the molecular weight is 778. (The spectrum being measured by increased sensitivity of the spectrometer above approximately m/e 500.) | Fig. 9. Parent peak at m/e 792 indicating that the molecular weight is 792. |
| NMR spectrum | Fig. 11. Measured in $CDCl_3$. The antibiotic shows absorptions of 9.12 (triplet) 8.81 (doublet) and 8.73 (doublet). | Fig. 12. Same as S–3466 A. | Fig. 13. Measured in $CDCl_3$. The antibiotic shows absorptions of 9.12 (triplet) and 8.81 (doublet). The signal at 8.73 disappeared. |
| Optical rotation | +6.9° in chloroform. | +2.0° in chloroform. | 0.0° in chloroform. |
| Molecular formula | $C_{42}H_{68}O_{12}$. | $C_{43}H_{70}O_{12}$. | $C_{44}H_{72}O_{12}$. |
| Reaction | Fehling, Tollens, Carbazole, Elson-Morgan and Ninhydrin are all negative. | The same as S–3466 A. | The same as S–3466 A; |

EXPERIMENT 2

Miticidal activity on *Tetranyclus telarius* L.

Leaves of kidney beans (*Phaseolus vulgaris*) were inoculated with 90–120 adult mites and 200–250 ova of *Tetranychus telarius* L. and immersed in an emulsion which had been diluted to the predetermined concentrations as shown in Table 2 and consisted of 40 parts by weight of S-3466 complex, S-3466 A, S-3466 B or S-3466 C, 40 parts of xylene, 10 parts of cyclohexanone and 10 parts of Sorpol (trademark for an anionic surface active agent; produced by Toho Chemicals). The leaves thus treated were then incubated in a thermostatic room at a temperature of 25° C. and investigated for the percent mortality of the adult mites after 24 hours in the thermostatic room and for the percent mortality of the ova after 7 days. The results obtained were compared with those obtained in the same test using an emulsion of Kelthane (Rohm & Haas Co.) as a control and were as shown in Table 2.

TABLE 4

| Plant | Time lapse after sprayed (day) | Sprayed concentration (p.p.m.) | | | | | |
|---|---|---|---|---|---|---|---|
| | | 1,600 | 800 | 400 | 200 | 100 | Untreated |
| Chrysanthemum. | 2 | ++ | + | ± | — | — | — |
| | 4 | ++ | ++ | ± | ± | — | — |
| Daisy | 2 | — | — | — | — | — | — |
| | 4 | — | — | — | — | — | — |
| Tomato | 2 | — | — | — | — | — | — |
| | 4 | — | — | — | — | — | — |
| Egg-plant | 2 | — | — | — | — | — | — |
| | 4 | — | — | — | — | — | — |
| Kidney beans. | 2 | — | — | — | — | — | — |
| | 4 | — | — | — | — | — | — |
| Cucumber | 2 | — | — | — | — | — | — |
| | 4 | — | — | — | — | — | — |
| Chinese cabbage. | 2 | +++ | + | + | ± | ± | — |
| | 4 | +++ | + | + | ± | ± | — |

NOTE.—The symbols used in the above table have the following meanings: —=No spot; ±=Spot area less than 3%, +=Spot area of 3 to 10% ++=Spot area of 10 to 30%; +++=Spot area more than 30%.

TABLE 2

| Concentration of active ingredient, p.p.m. | S-3466 complex emulsion (percent) | | S-3466 A emulsion (percent) | | S-3466 B emulsion (percent) | | S-3466 C emulsion (percent) | | Kelthane emulsion (percent) | |
|---|---|---|---|---|---|---|---|---|---|---|
| | Mortality of adult mite | Mortality of ovum | Mortality of adult mite | Mortality of ovum | Mortality of adult mite | Mortality of ovum | Mortality of adult mite | Mortality of ovum | Mortality of adult mite | Mortality of ovum |
| 200 | 100 | 100 | 100 | 100 | 100 | 100 | 100 | 100 | 100 | 100 |
| 100 | 100 | 100 | 100 | 100 | 100 | 100 | 100 | 100 | 100 | 100 |
| 50 | 100 | 100 | 100 | 100 | 98.8 | 80.5 | 100 | 96.4 | 100 | 98.5 |
| 25 | 100 | 94.1 | 100 | 96.0 | 93.2 | 63.3 | 98.2 | 82.5 | 98.8 | 90.2 |
| 12.5 | 96.0 | 91.2 | 98.0 | 90.3 | 91.2 | 61.2 | 92.4 | 60.4 | 96.0 | 73.0 |
| 6.3 | 85.4 | 88.9 | 88.3 | 91.5 | 75.5 | 48.9 | 74.2 | 50.6 | 83.4 | 60.4 |
| 3.1 | 76.8 | 74.0 | 79.1 | 70.3 | 64.3 | 36.3 | 60.5 | 42.1 | 72.3 | 21.7 |
| 1.6 | 63.5 | 69.5 | 68.3 | 69.1 | 50.1 | 20.1 | 51.4 | 30.5 | 52.1 | 11.5 |

EXPERIMENT 3

Insecticidal activity on green peach aphid 40 to 50 green peach aphid (*Myzus percicae* Sulzer) were made parasitic to the pot-planted egg-plant and sprayed thoroughly with a wettable powder of the antibiotic complex S-3466 having the predetermined concentrations as shown in Table 3 below. The wettable powder above was prepared by intimately blending 40 parts of the antibiotic complex S-3466, 35 parts of Radiolite #200 (trademark for a diatomaceous earth) and 20 parts of white carbon, and adding 3.5 parts of Sorpol 5024-0 (trademark for an anionic surface active agent; produced by Toho Chemicals) and lignin sulfonate to the resulting blend followed by thorough blending of the mixture. The aphids and the plant were then allowed to stand in a thermostatic room having a temperature of 25° C., and, after 24 hours, investigated for the percent mortality of the aphids. The results were compared with those obtained by DDT wettable powder used as a control, and were as shown in Table 3.

TABLE 3

| Concentration of active agent, p.p.m. | Percent mortality of— | |
|---|---|---|
| | S-3466 emulsion | DDT wettable powder |
| 200 | 100 | 98.0 |
| 100 | 90.5 | 82.2 |
| 50 | 81.2 | 50.3 |
| 25 | 62.4 | 13.5 |

EXPERIMENT 4

Toxicity on plants

The pot-planted chrysanthemum, daisy, tomato, egg-plant, kidney beans, cucumber and chinese cabbage were thoroughly sprayed with the same agent as used in Example 3 diluted to the predetermined concentrations shown in Table 4 below, and the thus treated plants were then allowed to stand in a greenhouse. After 2 and 4 days in the greenhouse, the plants were examined for the degree of damage caused by the agent, and the results were as shown in Table 4.

EXPERIMENT 5

Acute toxicity in mice

The 50% lethal dose ($LD_{50}$) of the antibiotic complex S-3466 was determined in mice and found to be 3450 mg./kg. by oral administration.

EXAMPLE 1

(a) 10 l. of a medium consisting of 1% glucose, 2% glycerin, 0.2% peptone, 0.2% yeast extract, 0.2% meat extract, 2% soybean meal, 0.05% magnesium sulfate, 0.1% dipotassium hydrogenphosphate and 1% calcium carbonate was charged into a jar fermentor and sterilized in the usual manner. The medium was then inoculated with 200 ml. of a seed liquid of *Streptomyces aureus* S-3466 (FERM-P No. 233; ATCC No. 21428) which had been shake-cultured for 3 days at 27° C. in a medium having the same composition as above, and the microorganism was cultured for 4 days at 27° C. with aeration at a rate of 5 l. per minute while stirring at a rate of 250 r.p.m. The fine, pulp-like mycelium was separated by means of a centrifugator together with a De Laval type separator and extracted twice with 2 l. of acetone. The extract was concentrated in vacuo to distill off acetone, and the resulting concentrate was extracted twice with 1 l. of n-hexane. The latter extract was then concentrated in vacuo to distill off the n-hexane to yield an oily red-brown substance.

The thus obtained oily substance was then passed through a column of 25 x 300 mm. packed with about 100 g. of silica gel using n-hexane as a solvent, and the column was eluted with a mixture of the solvents consisting of n-hexane-ethyl acetate (9:1). The resulting eluate was concentrated in vacuo to obtain a crude antibiotic complex S-3466 as an oily light yellow substance. The oily substance was then allowed to stand in a freezer for a period of one week to give 2 g. of crude crystals of the antibiotic complex S-3466.

EXAMPLE 2

(a) 1 l. of a medium consisting of 2.0% glucose, 0.5% corn steep liquor, 2.0% soybean meal, 0.05% magnesium sulfate, 0.2% peptone and 0.2% glycerin, the balance being water, was charged in 100 ml. portions into ten 500-ml. Sakaguchi flasks. After the flasks had been sterilized in the usual manner, they were inoculated with *Streptomyces aureus* S–3466 (FERM–P No. 233; ATCC No. 21428) which was then cultured at 27° C. for a period of 72 hours with shaking. The fermentation broth was placed in a 3 l. Erlenmeyer flask, adjusted to a pH of about 3.0 by the addition of sulfuric acid and heated at a temperature of 80° C. followed by being maintained at that temperature for about two hours. After allowing to cool, the fermentation broth was filtered to recover the mycelium which was then extracted with 1 l. of acetone while heat-refluxing. The acetone extract was then distilled in vacuo, and the resulting concentrate was extracted twice with 500 ml. of n-hexane. The extract was dried and distilled in vacuo to give a red-brown oily substance. Upon allowing the substance to stand in a freezer, 100 mg. of the crude antibiotic complex S–3466 was obtained as slightly yellowish crystals. The remaining oily substance was subjected to column chromatography of silica gel, and the column was developed with a mixture of solvents consisting of n-hexane-ethyl acetate (9:1) followed by the separation of the product to give an additional 95 mg. of the crude crystalline complex S–3466.

EXAMPLE 3

(a) 1 l. of a medium consisting of 2% glucose, 2% soybean meal, 0.5% corn steep liquor, 0.025% dipotassium hydrogenphosphate, 0.05% magnesium sulfate and 0.2% glycerin, the balance being water, was charged in 100 ml. portions into ten 500-ml. Sakaguchi flasks. After the flasks had been sterilized in the usual manner, they were inoculated with an inoculum of *Streptomyces aureus* S–3466 (FERM–P No. 233; ATCC No. 21428) which was then cultured at 27° C. for a period of 72 hours with shaking. The fermentation broth was placed in a 3 l. Erlenmeyer flask, adjusted to a pH of about 3.0 by addition of sulfuric acid and heated at a temperature of 80° C. followed by being maintained at that temperature for one hour. After allowing to cool, the fermentation broth was filtered to recover the mycelium which were then extracted with 1 l. of methanol while heat-refluxing. The extract was then distilled in vacuo to remove methanol, and the residue was extracted twice with 500 ml. of n-hexane. The combined extracts were dried, concentrated to 100 ml. and allowed to stand to give 4.2 g. of crude crystals of the antibiotic complex S–3466.

(b) 2.0 of the crude crystals of S–3466 obtained in part (a) above was dissolved in a small amount of ethyl acetate, and the resulting solution was then subjected to column chromatography using 400 g. of silica gel (E. Merck Co., particle diameter being less than 0.08 mm.) and ethyl acetate as a solvent, whereby 1.51 g. of pure crystals of the antibiotic complex S–3466.

EXAMPLE 4

Seven hundred milligrams of the pure antibiotic S–3466 obtained in Examples 1 to 3 was dissolved in a small amount of chloroform-ethyl acetate mixed solvent (2:1) and the solution was poured at the top of the silica gel column (30 x 500 mm.) packed 120 g. of silica gel (E. Merck Co., particle diameter being less than 0.08 mm.). The column was at first eluted wtih 1.5 l. of chloroform: ethyl acetate (2:1) and the eluate was fractionated every 15 ml.

The antibiotic S–3466 in each fraction was examined by bio-assay using *Bacillus subtilis* and thin layer chromatography using silica gel. The fractions containing S–3466, tube No. 70–100, were combined and concentrated in vacuo to give 120 mg. of S–3466 A.

The column was secondary eluted with 1 l. of chloroform:ethyl acetate (1:1) and treated in the same manner as S–3466 A to give 400 mg. of S–3466 B (the S–3466 B were observed in tube No. 105–150).

The column was finally washed with 1 l. of ethyl acetate and the eluate was concentrated in vacuo to give 110 mg. of S–3466 C.

EXAMPLE 5

(a) 20 l. of a medium consisting of 2% glucose, 1% soluble starch, 1.5% soybean meal, 0.5% NaCl, 0.025% $K_2HPO_4$, 0.05% $MgSO_4 \cdot 7H_2O$, 0.4% $CaCO_3$ and 0.02% Adekanol (trademark; defoaming agent produced by Asahi Electro-Chemical Co., Ltd., Tokyo·Osaka) was charged into a jar fermentor and sterilized in the usual manner. The medium was then inoculated with 200 ml. of a seed liquid of a mutant M–3–118 (ATCC No. 21658) derived from *Streptomyces aureus* S–3466 (FERM–P No. 233; ATCC No. 21428), which had been shake-cultured for 3 days at 27° C. in a medium having the same composition as above, and the micro-organism was cultured for 3 days at 27° C., with aeration at a rate of 15 l. per minute while agitating at a rate of 250 r.p.m.

The pH of the broth was adjusted at 3.0 with sulfuric acid and the broth was heated at 80° C. for 30 minutes, followed by filtration with the addition of 2% Radiolite–900 (trademark; diatomaceous earth sold by Showa Chemical Industry Co., Ltd., Tokyo).

The filter cake thus obtained was extracted with 10 l. of methanol while refluxing and the extract was concentrated in vacuo and the resulting concentrate was extracted with 5 l. of n-hexane.

The latter extract was then concentrated in vacuo to distill off n-hexane to yield about 130 g. of an oily substance. The oily substance was allowed to stand overnight to give S–3466 complex as a solid substance.

The substance was crashed and washed with cold methanol to give 90 g. of a crude crystal of S–3466 complex.

(b) Two grams of crude S–3466 complex was dissolved in a small amount of chloroform and the solution was treated in the same manner as in Example 4 using a column (40 x 500 mm.) packed with 400 g. of silica gel. Yield: S–3466 A (150 mg.), S–3466 B (720 mg.) and S–3466 C (912 mg).

This mutant M–3–118 derived from *Streptomyces aureus* S–3466 was deposited wtih the ATCC under No. 21658.

Figure 1:
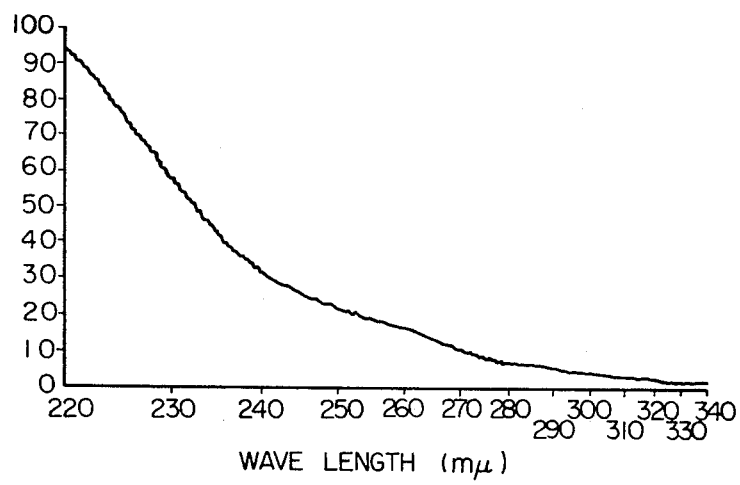
FIG. 1 illustrates an ultraviolet absorption spectrum of the antibiotic complex S-3466.
Figure 2:
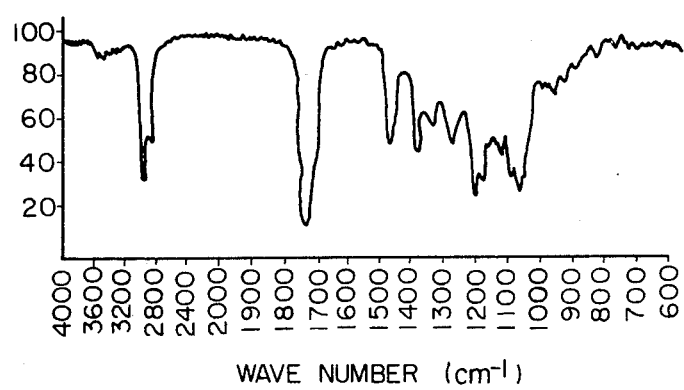
FIG. 2 illustrates an infrared absorption spectrum of the antibiotic complex S-3466.

What is claimed is:

1. An antibiotic complex S–3466 useful as antimicrobial, insecticidal and miticidal agents, which is colorless or slightly yellowish prismatic crystals, sometimes obtained as an oily substance; which is neutral and stable against heat and light; which melts at 72 to 75° C. (recrystallized from n-hexane); which is soluble in most of the organic solvent such as n-hexane, benzene, chloroform, diethyl ether, acetone, ethyl acetate, petroleum ether and alcohols, but insoluble in water; which has following elementary analysis: C, 66.07%, H, 9.07%, halogens, nitrogen and sulfur are not detected; which is negative to the following reactions: Fehling, Tollens, Carbazole, Elson-Morgan and Ninhydrin reactions; which shows no ultra-violet absorption maxima in the region of 200–400 m$\mu$ in methanol as shown in FIG. 1; which has an infrared spectrum exhibiting characteristic absorption bands at 2960, 2920, 2860, 1733, 1460, 1381, 1334, 1274, 1195, 1171, 1122, 1092, 1063 and 950 cm.$^{-1}$, as measured on a liquid film, which indicate the presence of methyl radical, methylene radical, carbonyl, and carboxylic acid ester as shown in FIG. 2; which has a mass spectrum absorption showing parent peak at m/e 792 as shown in FIG. 6; and which has an NMR spectrum, measured in $CDCl_3$, showing absorptions of 9.12$\tau$ (triplet), 8.81$\tau$ (doublet) and 8.73$\tau$ (doublet) as shown in FIG. 10.

Figure 3:
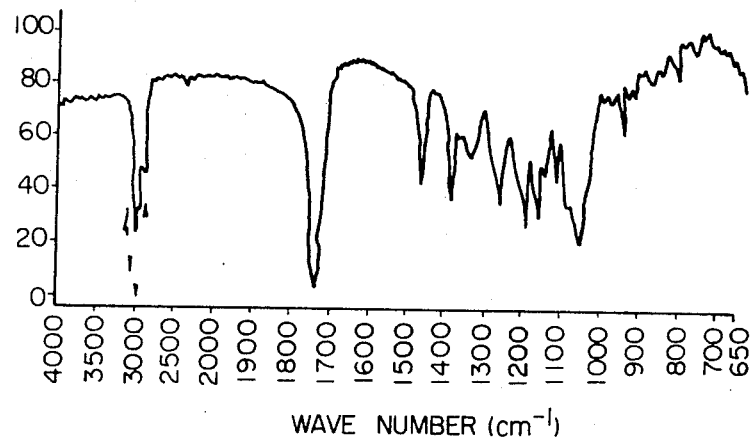
FIG. 3 illustrates an infrared absorption spectrum of the antibiotic S-3466 A.

2. An antibiotic S–3466 A useful as antimicrobial, insecticidal and miticidal agents, which is colorless prismatic crystals; which is neutral and stable against heat and light; which melts at 73 to 74° C. (recrystallized from n-hexane); which is soluble in most of the organic solvent such as n-hexane, benzene, chloroform, diethyl ether, acetone, ethyl acetate, petroleum ether and alcohols, but insoluble in water; which has following elementary analysis for $C_{42}H_{68}O_{12}$: C, 65.58%, H, 8.85%, halogens, nitrogen and sulfur are not detected; which has an infrared spectrum, as shown in FIG. 3, exhibiting characteristic absorption bands at 2960, 2920, 2860, 1733, 1460, 1381, 1334, 1274, 1195, 1171, 1122, 1092, 1063 and 950 cm.$^{-1}$ as measured on a liquid film, an infrared spectrum exhibiting strong absorption at 1735 cm.$^{-1}$ as measured by KBr disc method and an infrared spectrum exhibiting strong absorption at 1720 cm.$^{-1}$ as measured by the $CHCl_3$ solution method, which indicate the presence of methyl radical, methylene radical, carbonyl, carboxylic acid esters; which has a mass spectrum absorption showing parent peak at m/e 764 as shown in FIG. 7; which has NMR spectrum, measured in $CDCl_3$, showing absorption of 9.12$\tau$ (triplet), 8.81$\tau$ (doublet) and 8.73$\tau$ (doublet) as shown in FIG. 11; which shows an optical rotation of +6.9° in chloroform; and which is negative to the following reaction: Fehling, Tollens, Carbazole, Elson-Morgan and Ninhydrin reactions.

Figure 4:
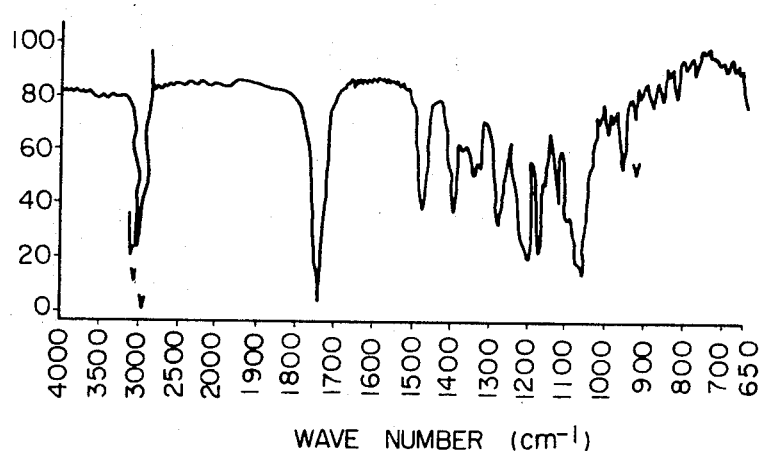
FIG. 4 illustrates an infrared absorption spectrum of the antibiotic S-3466 B.

3. An antibiotic S–3466 B useful as antimicrobial, insecticidal and miticidal agents, which is colorless prismatic crystals; which is neutral and stable against heat and light; which melts at 79 to 80° C. (recrystallized from n-hexane); which is soluble in most of the organic solvents such as n-hexane, benzene, chloroform, diethyl ether, acetone, ethyl acetate, petroleum ether and alcohols, but insoluble in water; which has following elementary analysis for $C_{43}H_{70}O_{12}$: C, 66.48%, H, 8.97%, halogens, nitrogen and sulfur are not detected; which has an infrared spectrum, as shown in FIG. 4, exhibiting characteristic absorption bands at 2960, 2920, 2860, 1733, 1460, 1381, 1334, 1274, 1195, 1171, 1122, 1092, 1063 and 950 cm.$^{-1}$ as measured on a liquid film and an infrared spectrum exhibiting strong absorption at 1735 cm.$^{-1}$ as measured by KBr disc method, which indicate the presence of methyl radical, methylene radical, carbonyl, carboxylic acid ester; which has a mass spectrum absorption showing parent peak at m/e 778 as shown in FIG. 8; which has an NMR spectrum, measured in $CDCl_3$, showing absorption of 9.12$\tau$ (triplet), 8.81$\tau$ (doublet) and 8.73$\tau$ (doublet) as shown in FIG. 12; which shows an optical rotation of +2.0° in chloroform; and which is negative to the following reactions: Fehling, Tollens, Carbazole, Elson-Morgan and Ninhydrin.

4. An antibiotic S–3466 C useful as antimicrobial, insecticidal and miticidal agents, which is colorless prismatic crystals; which is neutral and stable against heat and light; which melts at 105 to 106° C. (recrystallized from n-hexane); which is soluble in most of the organic solvents such as n-hexane, benzene, chloroform, diethyl ether, acetone, ethyl acetate, petroleum ether and alcohols, but insoluble in water; which has following elementary analysis for $C_{44}H_{72}O_{12}$: C, 65.41%, H, 9.13%, halogens, nitrogen and sulfur are not detected; which has an infrared spectrum, as shown in FIG. 5, exhibiting characteristic absorption bands at 2960, 2920, 2860, 1733, 1460, 1381, 1334, 1274, 1195, 1171, 1122, 1092, 1063 and 950 cm.$^{-1}$ as measured on a liquid film and an infrared spectrum exhibiting strong absorption at 1735 cm.$^{-1}$ as measured by KBr disc method, which indicate the presence of methyl radical, methylene radical, carbonyl, carboxylic acid ester; which has a mass spectrum absorption showing parent peak at m/e 792 as shown in FIG. 9; which has an NMR spectrum, measured in $CDCl_3$, showing absorption of 9.12$\tau$ (triplet) and 8.81$\tau$ (doublet) as shown in FIG. 13; which shows an optical rotation of 0.0° in chloroform; and which is negative to the following reactions: Fehling, Tollens, Carbazole, Elson-Morgan and Ninhydrin.

5. A process for the production of an antibiotic complex S–3466 which comprises the steps of:
cultivating *Streptomyces aureus* ATCC 21428 or ATCC 21658 in a nutrient medium containing assimilable carbon sources, nitrogen sources and inorganic salts under aerobic conditios for a time sufficient to obtain a fermentation broth having antibacterial activity and recovering said complex from the mycelium in said fermentation broth.

6. A process according to claim 5 wherein said cultivating step is accomplished at the temperature of 25–30° C. for 2–6 days.

7. A process in accordance with claim 5 wherein said recovering step comprises the steps of:
(a) adjusting the pH of the fermentation broth to about 3.0 with sulfuric acid and heating the fermentation broth at about 80° C. for about 3 hours;
(b) collecting the mycelium from the fermentation both by filtration
(c) extracting the mycelium with a water-miscible organic solvent selected from the group consisting of acetone and methanol and concentrating the water-miscible organic solvent extract;
(d) re-extracting the water-miscible organic solvent extract with a water-immiscible organic solvent selected from the group consisting of n-hexane and ethyl acetate; and
(e) concentrating the water-immiscible organic solvent extract.

References Cited

Miller, The Pfizer Handbook of Microbial Metabolities, McGraw-Hill Book Co., Inc., New York, N.Y., 1961, p. 126.

JEROME D. GOLDBERG, Primary Examiner

U.S. Cl. X.R.

195—80